US012711402B1

(12) United States Patent
Weller et al.

(10) Patent No.: US 12,711,402 B1
(45) Date of Patent: Aug. 18, 2026

(54) AI INNOVATION DEVELOPMENT SYSTEM AND METHOD

(71) Applicant: Deepinvent, Inc., Dover, DE (US)

(72) Inventors: Marcus Weller, Austin, TX (US); Aljosa Rakita, Kranj (SI)

(73) Assignee: DeepInvent, Inc, Dover, DE (US)

( * ) Notice: Subject to any disclaimer, the term of this patent is extended or adjusted under 35 U.S.C. 154(b) by 0 days.

(21) Appl. No.: 19/437,141

(22) Filed: Dec. 30, 2025

Related U.S. Application Data

(60) Provisional application No. 63/740,987, filed on Dec. 31, 2024.

(51) Int. Cl.
*G06N 5/022* (2023.01)
*G06F 16/901* (2019.01)

(52) U.S. Cl.
CPC ......... *G06N 5/022* (2013.01); *G06F 16/9024* (2019.01)

(58) Field of Classification Search
CPC ............................ G06N 5/022; G06F 16/9024
See application file for complete search history.

(56) References Cited

U.S. PATENT DOCUMENTS 10,238,394 B2 3/2019 Mohl et al.
11,017,038 B2 5/2021 Botea et al.
11,074,495 B2 7/2021 Zadeh et al.
11,645,548 B1 5/2023 Durvasula et al.
12,242,473 B2 3/2025 Neufel
2021/0232577 A1 7/2021 Ogawa et al.
2022/0019908 A1* 1/2022 Meyerzon .............. G06N 5/025
2025/0307663 A1* 10/2025 Yamaura ................ G06N 20/00

OTHER PUBLICATIONS

Tom B. Brown, et al., "Language Models are Few-Shot Learners," 34th Conference on Neural Information Processing Systems (NeurIPS 2020), 25 pages, Vancouver, Canada.
Juhwan Choi, et al., "Unigen: Universal Domain Generalization for Sentiment Classification via Zero-shot Dataset Generation," arXiv:2405.01022v3 [cs.CL] Sep. 22, 2024, 14 pages.
Francois Chollet, "On the Measure of Intelligence," arXiv:1911.01547v2 [cs.AI] Nov. 25, 2019, 64 pages.
Xiangnan He, et al., "Neural Collaborative Filtering," International World Wide Web Conference Committee, Apr. 3-7, 2017, pp. 173-182, Perth, Australia, http://dx.doi.org/10.1145/3038912.3052569.
Ian Hogarth, et al., "State of AI Report," Oct. 12, 2021.
M.I. Jordan, et al., "Machine learning: trends, perspectives, and prospects," Science, Jul. 17, 2025, pp. 255-260, vol. 349, Issue 6245, sciencemag.org.

(Continued)

*Primary Examiner* — Apu M Mofiz
*Assistant Examiner* — Oscar Wehovz
(74) *Attorney, Agent, or Firm* — Bold IP PLLC; Randy Fenton; Houda El-Jarrah

(57) ABSTRACT

An artificial intelligence (AI) innovation development system and method ingests global datasets of information including cross-disciplinary data, data mines the information within a knowledge graph including using white space analysis, performs recursive cycles of evolutionary inference with integrated feedback loops and ultimately identifies one or more innovation candidates that may be potentially patentable.

20 Claims, 7 Drawing Sheets

(56) References Cited

OTHER PUBLICATIONS

Patrick Lewis, et al., "Retrieval-Augmented Generation for Knowledge-Intensive NLP Tasks," 34th Conference on Neural Information Processing Systems (NeurIPS 2020), 16 pages, Vancouver, Canada.
James Manyika, et al., "Big data: The next frontier for innovation, competition, and productivity," McKinsey Global Institute, May 2011, 156 pages.
Gary P. Pisano, "You Need an Innovation Strategy," Harvard Business Review, Jun. 2015, 17 pages.
Michael E. Porter, et al., "How Smart, Connected Products are Transforming Competition," Harvard Business Review, Nov. 2014, 23 pages.
Luciano Cavalcante Siebert, et al., "Meaningful human control: actionable properties for AI system development," AI and Ethics, May 18, 2022, 3:241-255, https://doi.org/10.1007/s43681-022-00167-3.
David Silver, et al., "A general reinforcement learning algorithm that masters chess, shogi, and Go through self-play," Science Dec. 7, 2018, 362:1140-1144.
Dawei Zhu, et al., "Fine-tuning large language models to translate: will a touch of noisy data in misaligned languages suffice?" Proceedings of the 2024 Conference on Empirical Methods in Natural Language Processing, Nov. 12-16, 2024, pp. 388-409, Association for Computational Linguistics.

* cited by examiner

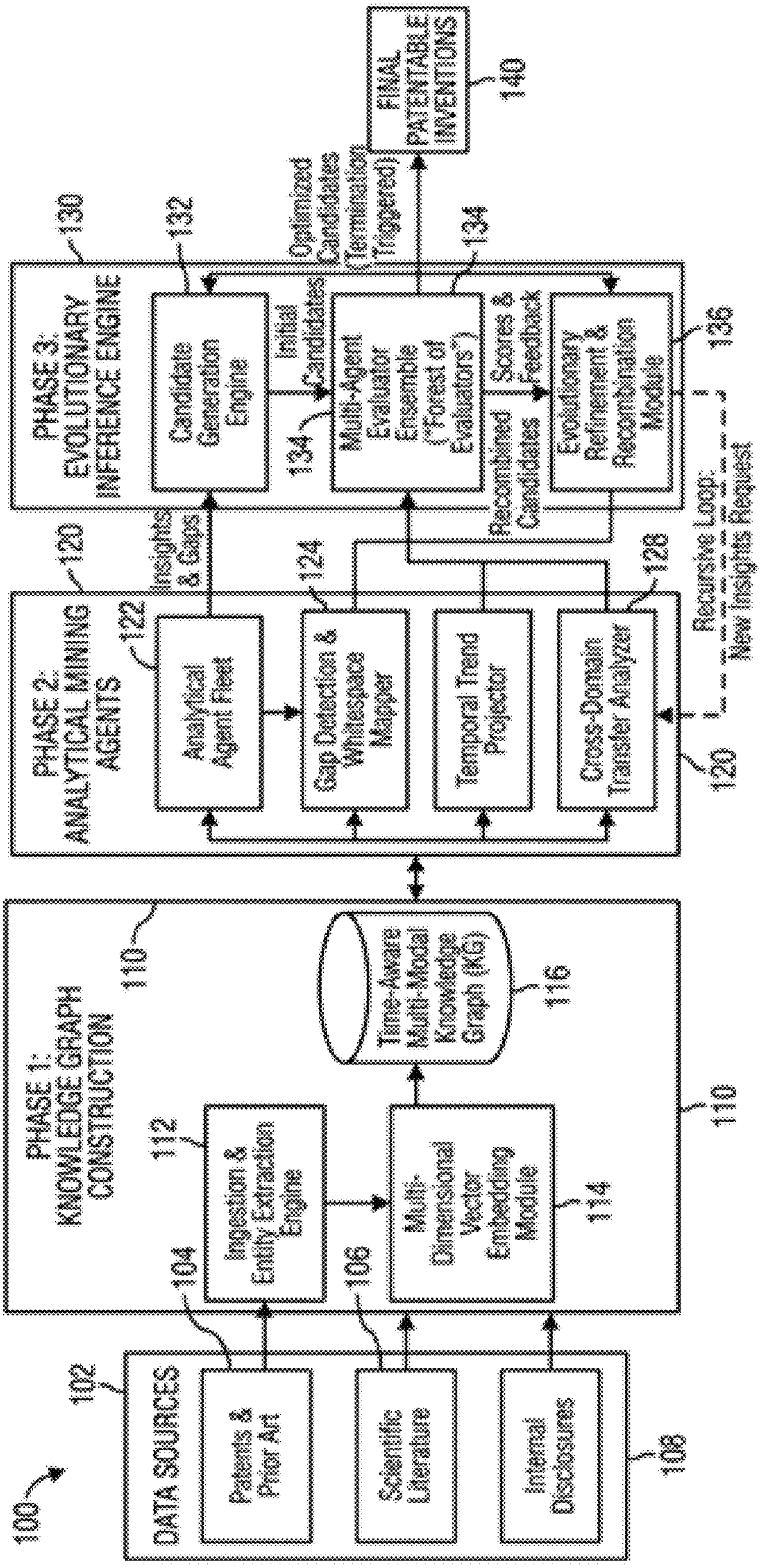

FIG. 3
100
DATA SOURCES
102
Patents & Prior Art
104
Scientific Literature
106
Internal Disclosures
108
PHASE 1: KNOWLEDGE GRAPH CONSTRUCTION
110
110
Ingestion & Entity Extraction Engine
112
Multi-Dimensional Vector Embedding Module
114
Time-Aware Multi-Modal Knowledge Graph (KG)
116
PHASE 2: ANALYTICAL MINING AGENTS
120
120
Analytical Agent Fleet
122
Gap Detection & Whitespace Mapper
124
Temporal Trend Projector
Cross-Domain Transfer Analyzer
128
Insights & Gaps
Recursive Loop: New Insights Request
PHASE 3: EVOLUTIONARY INFERENCE ENGINE
130
Candidate Generation Engine
132
Initial Candidates
Multi-Agent Evaluator Ensemble ("Forest of Evaluators")
134
134
Scores & Feedback
Evolutionary Refinement & Recombination Module
136
Recombined Candidates
Optimized Candidates (Termination Triggered)
FINAL PATENTABLE INVENTIONS
140

PHASE 1: Knowledge Graph

Data Inputs

Prior Patents

Organization Context

Scientific Literature

100. Heterogeneous Data Sources

Ingest

302

110. Parse & Normalize Data

120. Extract Technical Entities & Relationships

304

130. Compute Multi-Dimensional Feature Vectors (Novelty, Utility, Domain Proximity, Temporal)

306

140. Time-Aware Multi-Dimensional Knowledge Graph / Hypergraph

308

A

From D

AI INNOVATION DEVELOPMENT SYSTEM AND METHOD

CROSS-REFERENCE TO RELATED APPLICATIONS

This application claims priority to U.S. Provisional Application No. 63/740,987 filed Dec. 31, 2024, the entire contents of which are hereby fully incorporated herein by reference for all purposes.

FIELD OF THE INVENTION

This invention relates to innovation identification, including an artificial intelligence innovation identification and development system including whitespace analysis.

BACKGROUND

Traditional methods of whitespace analysis rely heavily on retrospective data analysis. While useful for understanding past trends, these methods do not accommodate the constant evolution of scientific knowledge and technological advancements. Typically, analysis conducted on static datasets can take several months, during which the market landscape can shift dramatically, rendering reports outdated by the time they are published. Static analysis fails to capture the dynamic nature of market changes, consumer preferences, and technological advancements, leaving businesses with insufficient information to inform strategic decisions. For example, in industries like biotechnology or consumer electronics, advancements occur at such a breakneck speed that innovations introduced today can become obsolete within a few months, highlighting the critical need for systems that can provide real-time insights. The static nature of traditional methods also means that by the time a potential whitespace area is identified, competitors might have already capitalized on similar ideas, diminishing the strategic advantage of early movers.

Accordingly, there is a need for an artificial intelligence (AI) innovation development system and method.

SUMMARY

According to one aspect, one or more embodiments are provided below for an artificial intelligent (AI) innovation development system and method. The AI innovation development system and method may include a computer-implemented method for generating innovation candidates, comprising: ingesting, by one or more processors, heterogeneous technical data from a plurality of repositories including at least one of patent documents, scientific literature, and internal disclosures; parsing and normalizing the heterogeneous technical data and extracting technical entities and relationships from the heterogeneous technical data; generating, for at least some of the extracted technical entities and relationships, respective multi-dimensional feature vectors that encode at least (i) a semantic representation and (ii) a temporal indicator; populating a time-aware, multi-modal knowledge graph with nodes and edges representing the at least some of the extracted technical entities and relationships, wherein the nodes are associated with the multi-dimensional feature vectors; deploying a plurality of analytical agents configured to query the time-aware, multi-modal knowledge graph to produce mining outputs including at least one of (i) whitespace mapping identifying underexplored regions of the knowledge graph, (ii) temporal trend extraction and projection, and (iii) cross-domain transferability analysis; generating, based on the mining outputs, an initial set of innovation candidates, each innovation candidate comprising a machine-readable representation of a proposed technical concept; evaluating the innovation candidates using a multi-agent evaluator ensemble that produces, for each innovation candidate, a composite score based on a plurality of heuristics including novelty and feasibility; and iteratively refining the innovation candidates using an evolutionary refinement process that selects higher-scoring innovation candidates and computationally recombines inventive concepts to generate new innovation candidates, wherein the deploying, evaluating, and iteratively refining are repeated in a recursive feedback loop until a termination condition is satisfied, and wherein one or more final innovation candidates are output responsive to satisfaction of the termination condition.

In another embodiment, ingesting heterogeneous technical data comprises continuously retrieving data from a plurality of external databases and providing it to a retrieval-augmented generation (RAG) preprocessing subsystem.

In another embodiment, parsing and normalizing the heterogeneous technical data comprises extracting technical entities using a predefined schema that identifies at least functional elements, operating parameters, and performance metrics.

In another embodiment, generating the multi-dimensional feature vectors comprises encoding at least one of: a novelty score relative to prior art embeddings, a non-obviousness indicator based on rarity of co-occurring features, and a utility indicator derived from claimed performance improvements.

In another embodiment, populating the time-aware, multi-modal knowledge graph comprises linking nodes using at least one of similarity metrics, causal dependencies, and temporal progressions.

In another embodiment, the plurality of analytical agents comprises at least one whitespace agent configured to identify sparsely connected regions of the knowledge graph using density-based clustering.

In another embodiment, the whitespace mapping comprises identifying clusters having a higher density of academic literature nodes than patent document nodes.

In another embodiment, the temporal trend extraction comprises tracking topic trajectories across successive time windows and classifying topics as emerging, plateauing, or declining.

In another embodiment, the cross-domain transferability analysis comprises identifying structurally similar subgraphs across different technical domains having low application overlap.

In another embodiment, evaluating the innovation candidates comprises computing a composite score that combines evaluator-agent scores with scores derived from the multi-dimensional feature vectors.

In another embodiment, the recursive feedback loop further comprises re-querying the knowledge graph using refined innovation candidates as inputs.

In another embodiment, the termination condition comprises satisfaction of a predefined innovation-quality score threshold or detecting convergence of innovation candidates across successive refinement iterations.

According to another aspect, one or more embodiments are provided below for a system for generating innovation candidates, comprising: one or more processors; and one or more non-transitory computer-readable media storing instructions that, when executed by the one or more processors, cause the system to: ingest heterogeneous technical data from a plurality of repositories including at least one of patent documents, scientific literature, and internal disclosures; parse and normalize the heterogeneous technical data, and extract technical entities and relationships; generate multi-dimensional feature vectors for the extracted technical entities and relationships, the multi-dimensional feature vectors encoding at least a semantic representation and a temporal indicator; construct and maintain a time-aware, multi-modal knowledge graph comprising linked datapoints represented as nodes connected by edges representing detected relationships, wherein the nodes are associated with the multi-dimensional feature vectors; execute a plurality of domain-specialized agents that query the knowledge graph to generate mining outputs including whitespace mapping and at least one of temporal trend projection or cross-domain transfer analysis; generate innovation candidates based on the mining outputs; score the innovation candidates using a multi-agent evaluator ensemble configured to apply distinct heuristics to produce composite scores; and perform evolutionary refinement by selecting a subset of the innovation candidates based on the composite scores and recombining elements of the selected subset to generate additional innovation candidates, while requesting updated mining outputs from the plurality of domain-specialized agents as part of a recursive refinement loop, wherein the system outputs one or more innovation candidates when a termination criterion corresponding to at least one of a quality threshold, a stability criterion, or a resource budget is met.

In another embodiment, the multi-agent evaluator ensemble comprises evaluator agents applying distinct heuristics including novelty scoring, technical feasibility, and cross-domain applicability.

In another embodiment, the evolutionary refinement is guided by updated mining outputs generated during each refinement iteration.

In another embodiment, the system is configured to dynamically ingest newly published literature while maintaining the knowledge graph in near real time.

According to another aspect, one or more embodiments are provided below for a non-transitory computer-readable medium storing instructions that, when executed by one or more processors, cause performance of operations comprising: constructing a time-aware, multi-modal knowledge graph from heterogeneous technical data by extracting technical entities and relationships and associating nodes in the knowledge graph with multi-dimensional feature vectors including temporal indicators; performing knowledge-graph mining using a plurality of analytical agents to generate at least whitespace mapping output identifying sparsely connected regions of the knowledge graph; and generating and evolving innovation candidates via an evolutionary inference engine that (i) generates candidate concepts based on the mining, (ii) evaluates the candidate concepts using a plurality of evaluator agents applying distinct heuristics, and (iii) iteratively recombines higher-scoring candidate concepts in a recursive loop that incorporates updated mining output until a termination condition is satisfied.

In another embodiment, the operations further comprise computing citation network features indicative of non-obviousness.

In another embodiment, the operations further comprise identifying innovation candidates representing cross-domain transfer of mechanisms between unrelated technical fields.

In another embodiment, the recursive loop comprises periodically injecting interdisciplinary data to increase diversity of innovation candidates.

The presently disclosed AI innovation development system and method is more fully described in the detailed description below.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 shows a diagram of an artificial intelligence innovation development system may take according to exemplary embodiments hereof.

DETAILED DESCRIPTION OF EXEMPLARY EMBODIMENTS

Figure 1:
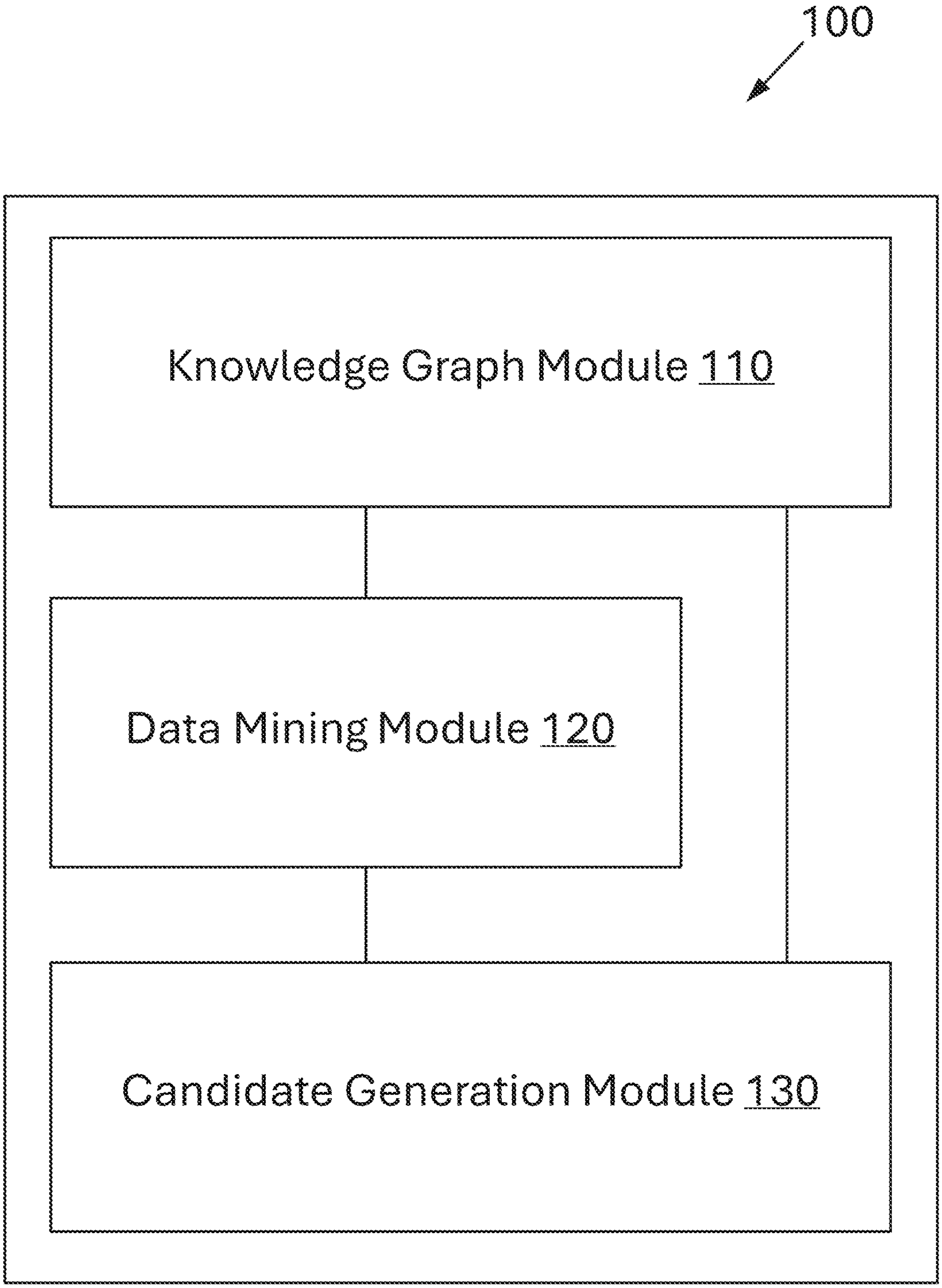
FIG. 1 shows a diagram of an artificial intelligence innovation development system according to exemplary embodiments hereof.
Figure 2:
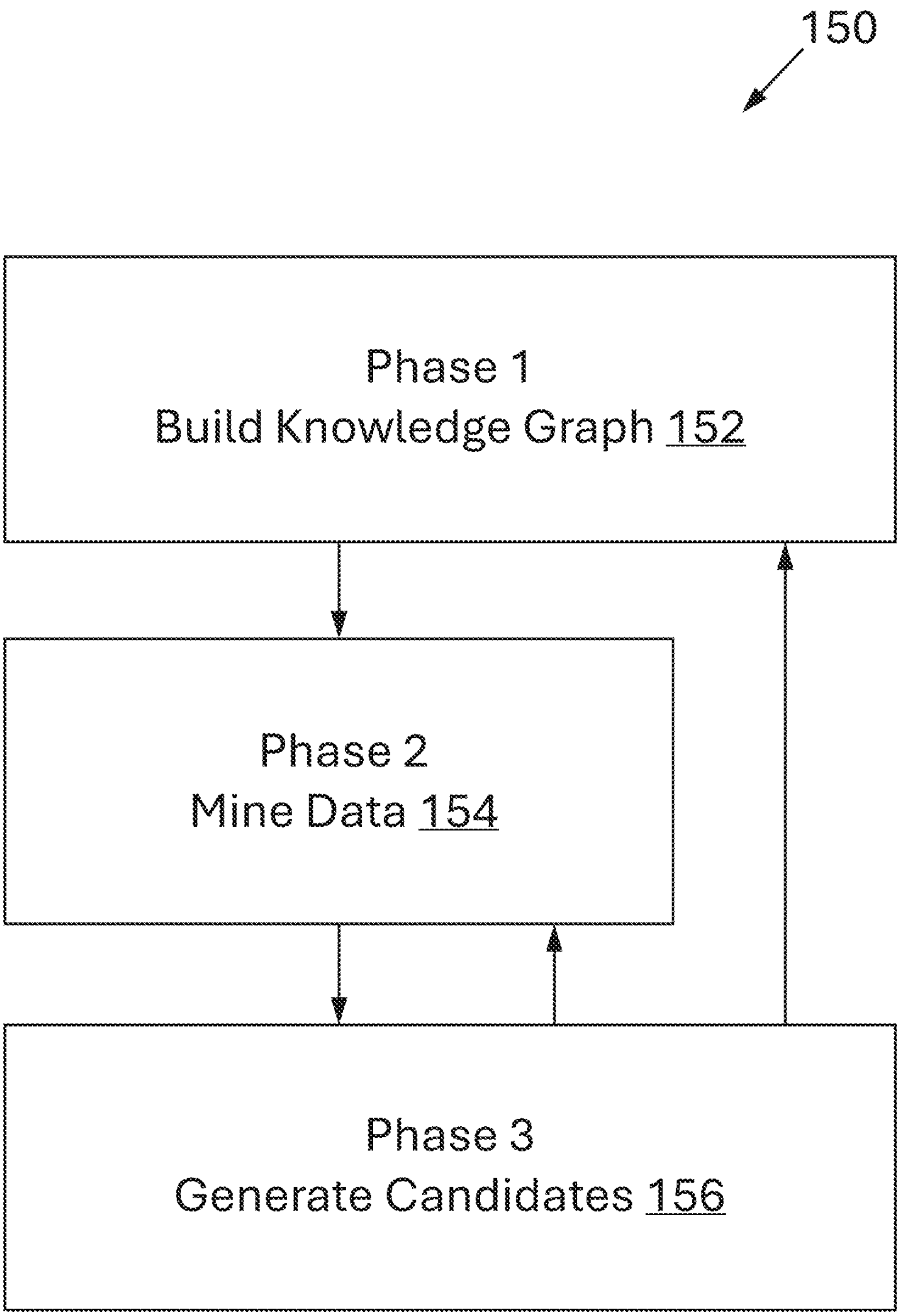
FIG. 2 shows actions that an artificial intelligence innovation development system may take according to exemplary embodiments hereof.

FIG. 1 shows a generalized diagram of an innovation development system 100 (also referred to herein as simply the system 100) according to exemplary embodiments hereof, and FIG. 2 shows generalized actions 150 that the innovation development system 100 may take during implementation.

As described herein, the system 100 may ingest global datasets of information including cross-disciplinary data, may data mine the information including performing recursive cycles of evolutionary inference with integrated feedback loops (while performing whitespace analyses), and may ultimately identify one or more innovation candidates (also referred to herein as inventions) that may be potentially patentable.

In some embodiments, as shown in FIG. 1, the innovation development system 100 includes a knowledge graph module 110, a data mining module 120, and an innovation candidate generation module 130 (also referred to as an evolutionary inference engine 130).

In some embodiments, as shown in FIG. 2, the system 100 is configured to generally operate in three phases, with Phase 1 including the knowledge graph module 110 ingesting heterogeneous data from a wide variety of data sources, and using the ingested data to construct a structured knowledge basis (e.g., a knowledge graph) at 152, with Phase 2 including the data mining module 120 mining the structured knowledge basis for insights at 154 (e.g., performing white space analyses on the knowledge graph), and with Phase 3 (at 156) including the innovation candidate generation module 130 iteratively evolving potentially patentable concepts (in combination of the modules 110, 120) to determine one or more innovation candidates.

FIG. 3 shows a block diagram of the innovation development system 100 including:

102: Data Sources (a grouping of external and internal information repositories).

104: Patents & Prior Art database (source for patent documents).

106: Scientific Literature database (source for articles and studies).

108: Internal Disclosures database (source for company materials).

110: Knowledge Graph Construction Module (Phase 1 subsystem for processing input data).

112: Ingestion & Entity Extraction Engine (component for normalizing data and extracting technical entities).

114: Multi-Dimensional Vector Embedding Module (component for generating feature vectors).

116: Time-Aware Multi-Modal Knowledge Graph (KG) (the dynamic structured database storing linked datapoints).

120: Analytical Mining Agents Module (Phase 2 subsystem for querying the KG).

122: Analytical Agent Fleet (a set of domain-specialized autonomous agents).

124: Gap Detection & Whitespace Mapper (specialized agent for finding underexplored areas).

126: Temporal Trend Projector (specialized agent for tracking and projecting trajectories).

128: Cross-Domain Transfer Analyzer (specialized agent for detecting parallel applications across domains).

130: Evolutionary Inference Engine (Phase 3 subsystem for generating and refining inventions).

132: Candidate Generation Engine (component for creating initial innovation candidates).

134: Multi-Agent Evaluator Ensemble ("Forest of Evaluators", group of agents applying distinct heuristics to score candidates).

136: Evolutionary Refinement & Recombination Module (component for "breeding" top candidates based on feedback).

140: Final Patentable Inventions (innovation candidates, i.e., the output product of the system 100).

In some embodiments, as shown in FIG. 3, the system 100 is configured to ingest heterogeneous data, construct a structured knowledge basis, mine that basis for insights, and iteratively evolve patentable concepts (also referred to herein as innovation candidates or inventions). As shown in FIG. 3, the system 100 generally comprises a Knowledge Graph Construction Module 110 (that may correspond to Phase 1), an Analytical Mining Agents Module 120 (that may correspond to Phase 2), and an Evolutionary Inference Engine 130 (that may correspond to Phase 3).

To begin the process, a user of the system 100 describes their invention concept with sufficient technical detail for someone reasonably skilled in the art to understand it. The system 100 then runs its processes using this information as described herein to determine potential innovation developments pertaining to the invention concept.

The system 100 begins by receiving inputs from various Data Sources 102. These sources may include, but are not limited to, patents and prior art databases 104, scientific literature repositories 106, and internal disclosures 108 containing unpublished company materials. These diverse inputs are fed into the Knowledge Graph Module 110. Within this module, an Ingestion & Entity Extraction Engine 112 is configured to receive, parse, and normalize the incoming data, automatically extracting semantically relevant technical data points such as functional elements and operating parameters. Subsequently, a Multi-Dimensional Vector Embedding Module 114 generates machine-interpretable representations for these data points, encoding dimensions such as novelty and temporal indicators. These processed inputs populate a Time-Aware Multi-Modal Knowledge Graph (KG) 116, which serves as the central structured database for the system.

Once the KG 116 is populated, the Analytical Mining Agents Module 120 may be engaged. This module comprises an Analytical Agent Fleet 122, e.g., a set of domain-specialized autonomous agents. The fleet 122 coordinates specialized sub-modules, including a Gap Detection & Whitespace Mapper 124 utilized to locate sparsely connected node regions in the KG 116 indicating technological gaps. The fleet also utilizes a Temporal Trend Projector 126 and a Cross-Domain Transfer Analyzer 128 to identify evolving themes and potential parallel applications between disparate domains, respectively.

The insights generated by Phase 2 are provided to the Evolutionary Inference Engine 130. A Candidate Generation Engine 132 uses these insights to produce an initial set of conceptual innovation candidates. These candidates are submitted to a Multi-Agent Evaluator Ensemble 134 (sometimes referred to as a "forest of evaluators"), where different agents apply distinct heuristics, such as novelty scoring or technical feasibility, to evaluate the candidates. As indicated by the feedback loops in FIG. 3, high-scoring candidates are passed to an Evolutionary Refinement & Recombination Module 136. This module "breeds" new candidates by computationally recombining core inventive concepts, guided by fresh insights requested from the Analytical Agent Fleet 122 via a recursive loop path. Once candidates satisfy termination criteria, the candidates are output as Final Patentable Inventions 140.

Figure 4:
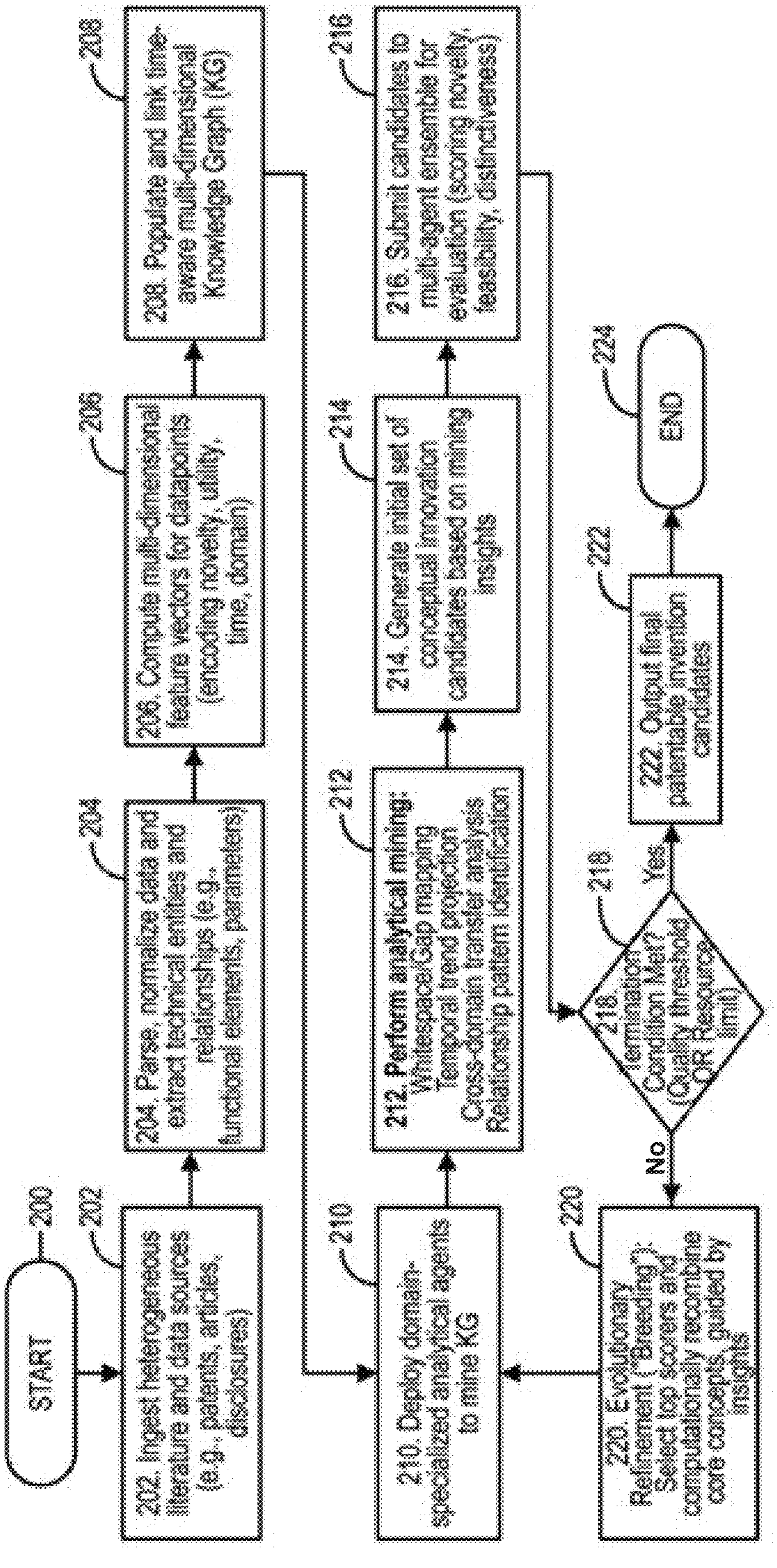
FIG. 4 shows actions that an artificial intelligence innovation development system may take according to exemplary embodiments hereof.

According to some embodiments, FIG. 4 shows a flow chart illustrating an example method 200 for generating potentially patentable inventions (i.e., innovation candidates) using recursive evolutionary inference and an iterative refinement loop. The method 200 may be executed by the system architecture 100 detailed in FIG. 1.

In some embodiments, the actions 200 may include:

202: Ingest heterogeneous literature step (Receiving data from sources).

204: Parse, normalize, and extract entities step (Processing raw data into technical points).

206: Compute multi-dimensional feature vectors step (Creating machine-interpretable representations).

208: Populate and link Knowledge Graph step (Building the dynamic graph).

210: Deploy analytical agents step (Instantiating specialized mining agents).

212: Perform analytical mining step (Executing gap mapping, trend projection, etc.).

214: Generate initial innovation candidates step (Creating proposed systems based on insights).

216: Submit to evaluator ensemble step (Scoring candidates on novelty, feasibility, etc.).

218: Termination condition check (Decision node for quality threshold or resource limit).

220: Evolutionary refinement ("Breeding") step (Recombining core concepts of top scorers).

222: Output final inventions step (Delivering the resulting candidates).

224: End (Completion of the process).

Further details of the actions 200 are provided below.

The method may begin at step 202 with the knowledge graph module 110 ingesting heterogeneous literature and data sources, such as those supplied by data sources 102 (FIG. 1). At step 204, the method parses and normalizes this data to extract technical entities and relationships. Next, step 206 involves computing multi-dimensional feature vectors for the extracted datapoints, encoding attributes like utility and domain proximity. At step 208, these vectors are used to populate and link a time-aware multi-dimensional Knowledge Graph (e.g., knowledge graph (KG) 116 in FIG. 1).

Once the foundation is built, the method proceeds to deploying domain-specialized analytical agents at step 210. These agents perform analytical mining of the KG 116 at step 212. This mining includes activities such as whitespace/gap mapping, projecting temporal trends, and identifying cross-domain transferability patterns. Based on the insights gathered at step 212, an initial set of conceptual innovation candidates is generated at step 214.

At step 216, these candidates are submitted to a multi-agent ensemble for evaluation based on criteria such as structural distinctiveness and support from literature-grounded evidence. The method then proceeds to a decision block at 218 to determine if a predefined termination condition has been met. This condition may be, for example, the satisfaction of an innovation-quality score threshold or reaching a maximum resource budget.

If the termination condition is not met ("No" at block 218), the process moves to the evolutionary refinement step 220. Here, top-scoring candidates are selected, and their core concepts are computationally recombined ("bred"), guided by the mining insights. The method then recursively loops back to step 210 to redeploy agents and analyze the refined concepts against the knowledge graph. If, however, the termination condition is met ("Yes" at block 218), the method proceeds to step 222, outputting the final patentable invention candidates, before concluding at block 224.

It is understood that the actions 200 described above need not all be taken, may be taken in other order(s), and that the system 100 may take additional actions as needed to fulfil its functionalities.

Further Details

Figure 5:
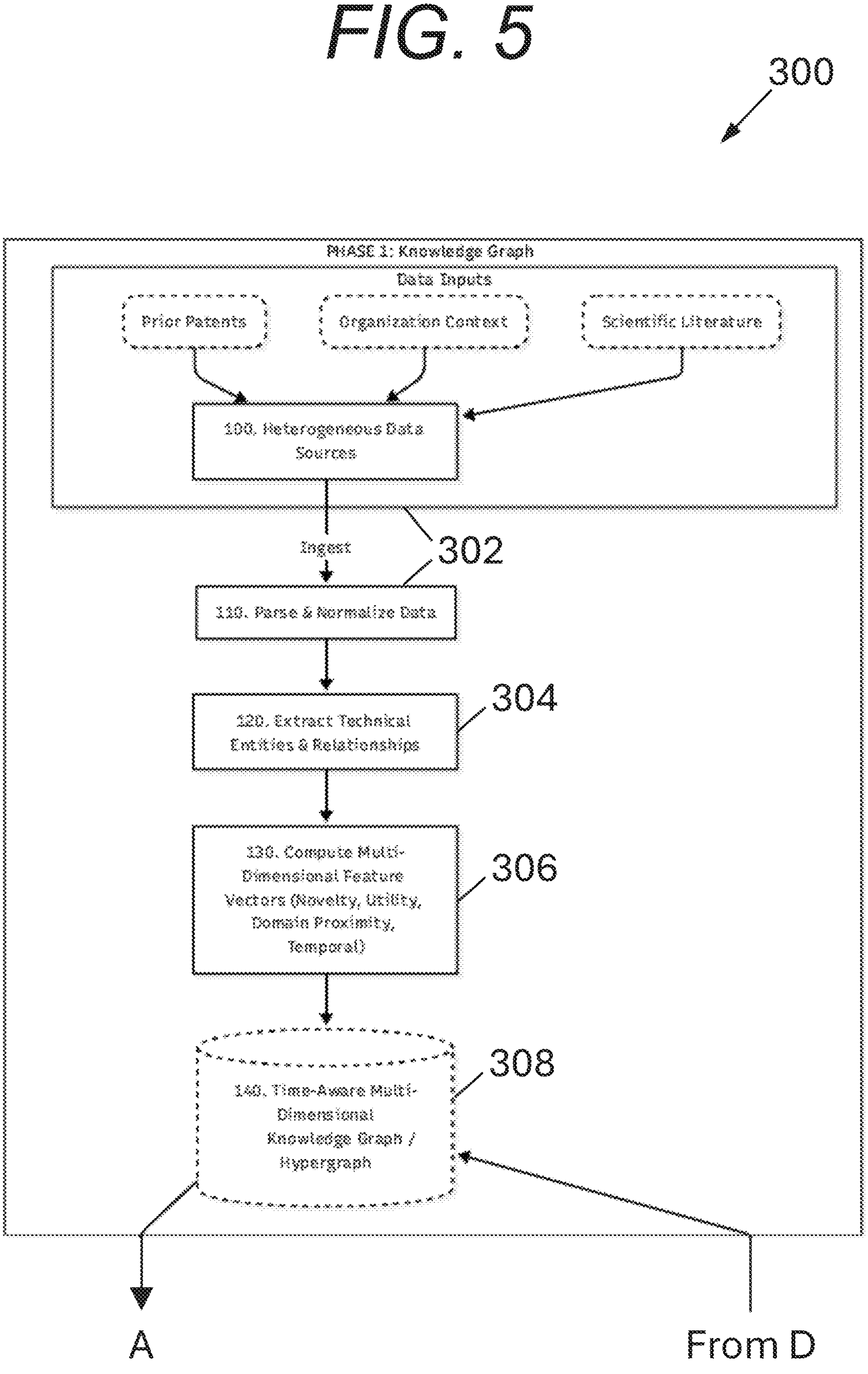
FIG. 5 shows actions that an artificial intelligence innovation development system may take according to exemplary embodiments hereof.
Figure 6:
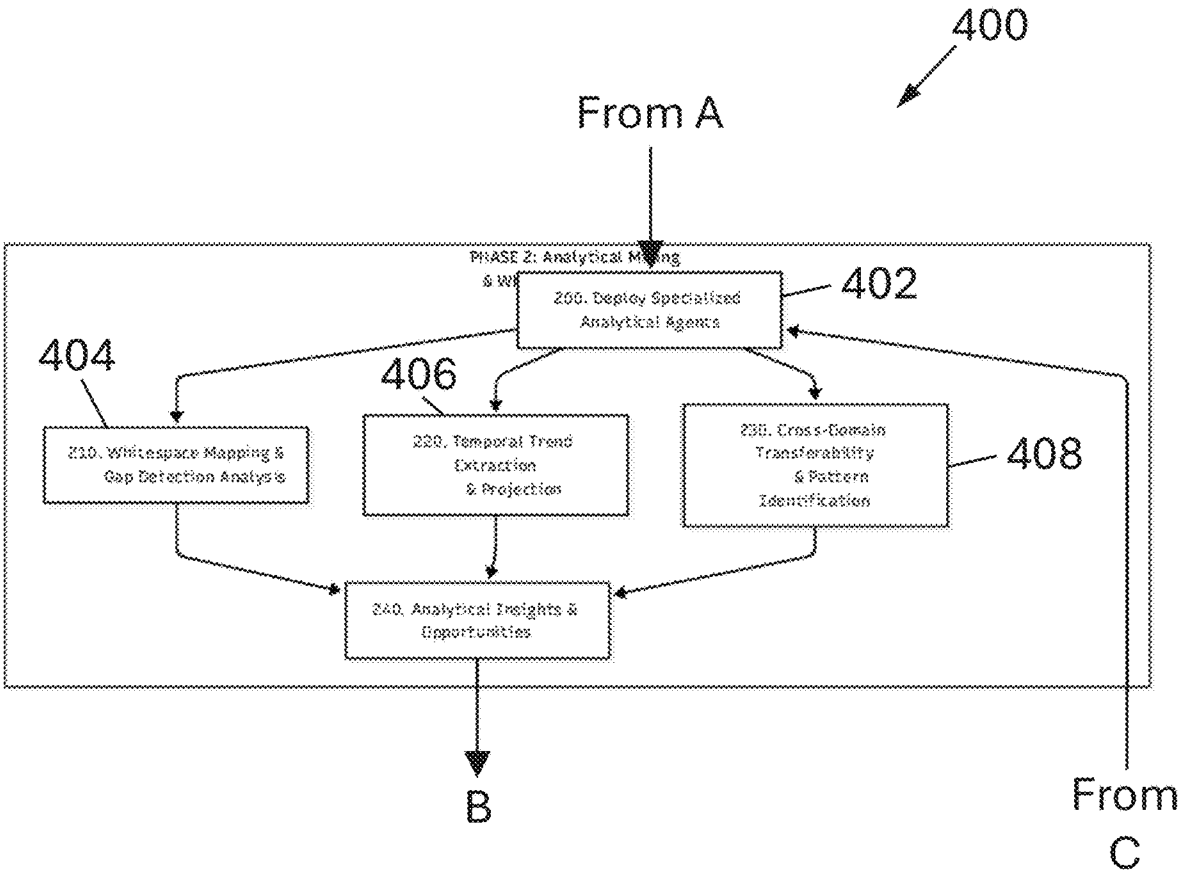
FIG. 6 shows actions that an artificial intelligence innovation development system may take according to exemplary embodiments hereof.
Figure 7:
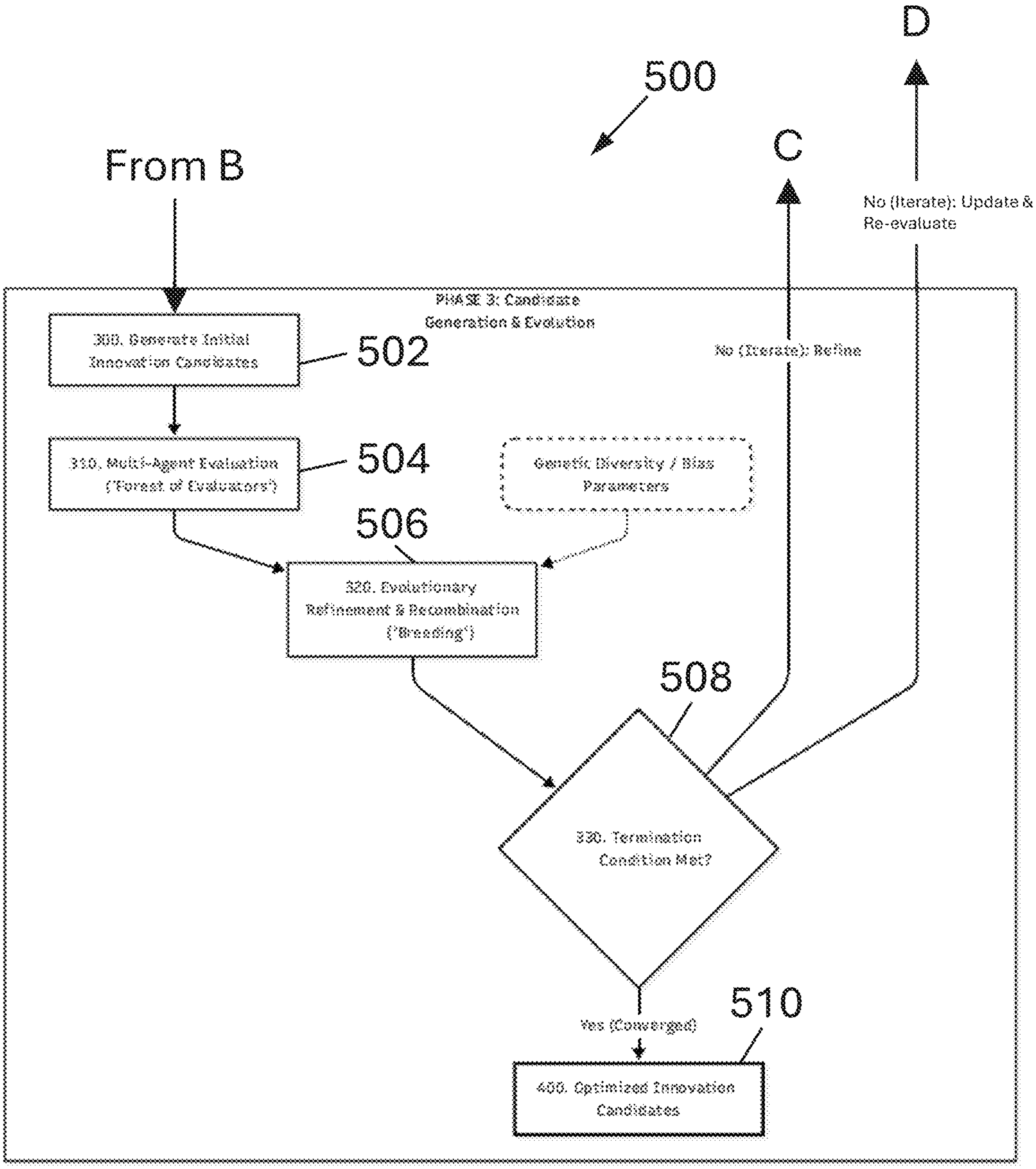
FIG. 7 shows actions that an artificial intelligence innovation development system may take according to exemplary embodiments hereof.

FIGS. 5, 6 and 7, generally corresponding to Phases 1, 2 and 3, respectively, show workflow actions that the system 100 may take.

In some embodiments, the knowledge graph module 110 includes a retrieval-augmented generation (RAG) preprocessing subsystem configured to operate on documents from various public and private sources, including but not limited to the USPTO, WPO, EPO, arXiv, PubMed, Semantic scholar, etc. Some of the documents may come from continuous scraping of bulk data and may then be preprocessed. Other documents may come from real time scraping of the sources based on the topics related to the concepts of the idea or concept of the potential innovation and may be processed in real time (e.g., "on the fly"). The RAG preprocessing subsystem segments retrieved scientific and patent documents into discrete content units and generates corresponding vector embeddings that encode semantic, technical, and contextual features of each content unit. The resulting embeddings and associated metadata are then stored and indexed for similarity-based retrieval and are used to populate and update a time-aware, multi-dimensional knowledge graph. This structured representation enables subsequent analytical and generative modules to access relevant prior art and technical disclosures without retraining a base language model.

Simultaneously, in some embodiments, the data mining module 120 includes a Recursive Evolutionary Inference (REI) framework conducts multiple cycles of idea generation and evaluation. Each cycle consists of processing a candidate set of potential innovations, quantitatively assessing their merit based on composite scores calculated using defined parameters such as novelty, utility, and non-obviousness. These quantitative measures use weighting algorithms calibrated through machine learning inputs that adapt as more data is fed into the system. Through successive iterations, guided by an evolutionary algorithm, the system refines these ideas into high-potential innovations that are creatively distinct and aligned with intellectual property protection requirements and market exploitation standards.

To enhance its capability in identifying white spaces within technological contexts, the REI process is particularly enriched by episodic introductions of cross-disciplinary data. This feature ensures continuous source diversity, resilience against the myopia of single-domain perspectives, and the production of novel insights that enable businesses to explore new R&D vistas. This provision creates an environment conducive to inter-disciplinary collaboration, fostering solutions that tackle complex issues from various technical viewpoints.

Knowledge Graph Module 110

In some embodiments, the integration of real-time data by the knowledge graph module 110 may be facilitated by Retrieval-Augmented Generation (RAG), leveraging a broad spectrum of data streams, including peer-reviewed articles, technical papers, patent filings, and real-time market analyses. This ensures that the system 100 operates on the most comprehensive and current dataset available. In some embodiments, the module 100 may aggregate data from scientific journals and databases (e.g., from over 500,000 different databases simultaneously), patent repositories (e.g., such as USPTO and EPO), and various industry reports and forecasts, thereby forming the backbone for the enhanced investigative capabilities of the system 100.

In some embodiments, the system 100 is built upon an agile data architecture capable of interfacing with virtually limitless scientific and patent databases globally. Using robust machine learning protocols, the system continuously assimilates new information streams, each filtered for relevance and potential impact. The data is then processed to develop embeddings that form the backbone of the RAG module.

In some embodiments, the architecture of the AI-driven system 100 includes a modular integration, utilizing a high-performance distributed computing framework that allows for massive parallel processing of data. Core to this architecture is the deployment of sophisticated algorithms capable of handling massive amounts of data simultaneously (e.g., terabytes of data) from diverse, globally distributed sources. Each data input undergoes standardization and initial preprocessing to ensure compatibility across datasets, followed by detailed machine learning processes to detect correlations and patterns that indicate potential areas of innovation. Furthermore, the system's machine learning models are continuously updated by continually feeding them with new instances of data, enabling perpetual learning and adaptation. This is critical in fields that experience rapid development cycles, such as AI and semiconductor technology, where new information is produced in unpredictable bursts. By maintaining a dynamic architecture that is both scalable and adaptive, the system 100 can meet the demands of contemporary R&D departments, which require flexibility and speed in processing large datasets efficiently.

In some embodiments, the knowledge graph module 110 is configured to construct a structured multi-modal knowledge graph that may then be used by the data mining module 120 and/or the candidate generation module 130. As such, the knowledge graph module 100 may ingest information (e.g., literature, etc.) and data sources and provide it to the other modules 120, 130 for analysis.

In some embodiments, as shown in FIG. 5, the knowledge graph module 110 may perform the following actions 300.

At 302, in some embodiments, the knowledge graph module 110 may be configured to receive, parse, and/or normalize heterogeneous data inputs from a variety of sources including: invention disclosures, company materials, scientific articles, published studies, patent documents, other sources and/or any combinations thereof.

In some embodiments, the module 110 may batch the various informational inputs, e.g., by continuously scraping document databases like USPTO, EP, Google Patents, Lens, arXiv, Google Scholar, PubMed, etc. In other embodiments, users of the system 100 may upload documents for the module 110 to use in real time, and/or the module 110 also may scrape additional databases, documents, websites and/or other sources based on the concept and/or idea that the user may provide to the system 100.

In some embodiments, the information (e.g., as raw files) may be stored to bucket, e.g., as Azure Blob storage. The module 110 may then chunk the documents into sections (e.g., text) and/or metadata from raw files (e.g., pdf, xlsx, docx, json, xml, etc.) and subsequently store the information, along with links to the raw files and source information, into a database (e.g., a Postgres database).

At 304, in some embodiments, the knowledge graph module 110 may extract technical entities and relationships, e.g., by automatically extracting semantically relevant technical data points (e.g., functional elements, operating parameters, methods, performance metrics, cited advantages, limitations). In some embodiments, the module 110 may Iterate over chunks and extract entities and relationships by passing it to LLM with strict schema, e.g., to entities with types: {"name": " . . . ", "type": " . . . ", "properties": { . . . }} and/or relations: subject-predicate object triples with evidence snippet. The module 110 also may normalize units, deduplicate entities (e.g., string similarity+embedding similarity) and link mentions to existing nodes by similarity threshold.

Next, at 306, in some embodiments, the module 110 may compute multi-dimensional feature vectors using the information. For example, the module 110 may generate machine-interpretable representations for each datapoint using a combination of domain-specific embeddings, statistical features, and engineered attributes. In some embodiments, these vectors may encode dimensions such as, but not limited to, novelty relative to corpus baselines, non-obviousness indicators, utility or functional impact, technological domain proximity, and/or temporal indicators.

In some embodiments, the knowledge graph module 110 also may implement semantic embeddings, e.g., OpenAI text-embedding-3-large of RAPTOR chunks, e.g., hierarchy of sections, from lowest original most detailed to highest which may include an entire document summarized.

In some embodiments, this also may include engineered features such as:

1. Novelty:
   a. Distance to K-nearest neighbors in embedding space; percentile vs corpus
   b. 1—max (similarity to prior art embeddings) in same domain/time window
2. Non-obviousness:
   a. Distance to convex hull of nearest documents; rarity of co-occurring features
   b. Citation network features (is this a rare combination of cited IPC classes?)
3. Utility/impact:
   a. Number and type of performance metrics claimed (e.g., % improvements).
   b. Citation velocity, venue quality. How many times it has been cited.
4. Domain proximity:
   a. One-hot/learned domain vector+cluster ID
5. Temporal:
   a. Normalized publication/filing date scalar Next, at 308, in some embodiments, the module 110 may then populate a time-aware multi-dimensional knowledge graph using the above (or at least a portion thereof). For example, the module 110 may position each datapoint within a shared multi-dimensional vector space and link the data points via edges representing detected relationships, causal dependencies, similarity metrics, and/or temporal progressions. The resulting knowledge graph may be dynamically updated as new literature is ingested and incorporated.

In some embodiments, the module 100 may then store the vectors (e.g., as the multi-dimensional knowledge graph) into a database, e.g., into a Postgres database with pgvector extensions with graph data stored in Neo4j. The knowledge graph module 110 may then provide the knowledge graph to the data mining module 120 at A.

Data Mining Module 120

In some embodiments, the data mining module 120 uses Recursive Evolutionary Inference (REI) to elevate the system's innovativeness by embedding a robust evolutionary model within its operational framework. This model proactively generates, evaluates, and refines innovative concepts through a structured cycle. Each cycle propagates a generative set of ideas assessed for novelty and utility using advanced algorithms that simulate biological evolution-akin to natural selection. These cycles include strategic injections of interdisciplinary insights, meticulously curated to maximize diversity and innovation potential, preventing the stagnation that occurs in less dynamic systems.

This iterative process is instrumental in identifying whitespace within technological landscapes-areas untapped by existing research or overshadowed by prevalent technological trends. These processes collectively empower organizations with actionable insights directly aligned with enhancing the strategic objectives of research and development units, enabling them to forge a proactive path toward sustainable development.

The recursive cycle of innovation fostered by the Recursive Evolutionary Inference (REI) process embodies the system's ability to generate and refine a continuous stream of high-potential innovative ideas.

In some embodiments, as shown in FIG. 6, the data mining module 120 may receive the knowledge graph(s) from the knowledge graph module 110 at A and may data mine the knowledge graph by performing the following actions 400.

At 402, in some embodiments, the data mining module 200 may employ one or more data analysis agents (e.g., machine learning agents) to mine the knowledge graph. Each data analysis agent may preferably be configured with distinct goals, heuristics, and/or evaluation criteria. For example, each agent may preferably include a clear system prompt (e.g., a goal) as well as Access tools, e.g., KG query, vector search (cosign similarity and/or other similarities), metrics compute (e.g., how many citations, etc.). For example, a prompt to use tool AA to achieve outcome BB.

In a first example, a data analysis agent may include "WhitespaceAgent" that calls clustering tools and inspects sparse regions. In another example, a data analysis agent may include "TrendAgent" that queries node time series and provides summaries of the same.

Next, at 404, in some embodiments, the data mining module 120 may provide cluster and gap-detection analysis (also referred to herein as whitespace mapping) for further data mining purposes. For example, in some embodiments, the data mining module 120 may use structural, semantic and/or temporal clustering to detect under-explored or discontinuous regions, identify areas lacking corresponding patented solutions despite academic development, and/or locate sparsely connected node regions that may indicate technological gaps.

For example, in some embodiments, the data mining module 120 may perform the following actions:

1. Filter by time and domain (e.g., choose the topic of interest such as bicycles or biotech but most likely not both). This may limit token usage and mitigate latency for the user
2. Operate semantic embedding space such as HDBSCAN to obtain centroids, local densities and outliers (e.g., points in low density regions of the knowledge graph). This may help to determine whether the data point is predominantly by itself or in a cluster. The module 200 also may identify regions of the knowledge graph with low density between clusters, areas of the knowledge graph where academic concepts may be clustered but patent nodes may be spars. In this way the module 200 may leverage existing models such that the creation the model may not be required.
3. Further mining of the knowledge graph may including running Louvain/Leiden community detection, measuring betweenness centrality and/or structural hole metrics (e.g., Burt's constraint) that looks at the clusters, and identifying entities bridging communities (e.g., weakly or not at all) and/or e.g., communities with high academic-paper density but few patent nodes.

Next, at 406, in some embodiments, the module 120 may next perform temporal trend extraction and projection to identify evolving research themes (e.g., topic(s) of the cluster(s)), track their trajectories across time-encoded dimensions, and project future developments, thereby revealing emerging opportunities before they may materialize in the known literature.

For example, for each time window, the module 200 may track cluster/topic popularity (e.g., document and citation count) and average novelty and utility. The module 200 also may classify topics as emerging, plateauing, or declining, and fit simple models (e.g., regressors) to predict trends of innovation into the future. In this way, the system 100 may predict one or more innovation trends and the directions that the innovation trends may be moving forward. This allows the user to predict future whitespace areas where innovation is likely to be needed, as well as the technical nature of the inventions, and through statistical regression, predict and develop inventions and intellectual property likely to be valuable and strategically meaningful.

Next, at 408, in some embodiments, the module 120 may perform cross-domain transferability analysis that may include detecting patterns within the datapoints of the knowledge graph where principles in one domain(s) may show structural or performance similarities to concepts in other domain(s), e.g., indicating opportunities for non-obvious parallel applications (e.g., aerodynamic efficiency techniques adapted to hydrodynamics).

In some embodiments, this may include identifying cross-domain similarities via embedding maps wherein the module 120 may generate candidates thereby, e.g., for each cluster in domain N, search for semantically similar clusters in domain M (e.g., using cosine similarity in embedding space). This also may include evaluating candidates with LLM, e.g., identifying High similarity of mechanisms; low overlap of application domains likely points to strong cross-domain transfer candidate.

In some embodiments, this also may include the module 200 performing graph meta-pattern mining, e.g., to generate candidates by identifying structural patterns (mechanism→performance gain→constraint) in one particular domain. This also may include the module 120 searching for similar subgraphs in other domains that may lack those mechanisms.

Next, at 410, in some embodiments, the module 120 may next identify relationship patterns by analyzing recurring link motifs, causal paths, and/or dependency structures that may reveal latent innovation potential, limitations, and/or systemic inefficiencies. For example, the module 120 may generate interesting paths within the knowledge graph, e.g., high-betweenness nodes, long dependency chains, and/or paths with mixed domains. The module 120 also may feed these paths to data analysis agents that may then suggest improvements and/or recommendations, e.g., "Summarize what this structure does and where the weak link is" or "Suggest variations that remove bottlenecks."

In some embodiments, the data mining module 120 may then provide its analysis results to the candidate generation module 130 at B.

Candidate Generation Module 130

In some embodiments, as shown in FIG. 7, the candidate generation module 130 receives the data analysis results from the data mining module 120 at B and provides automated identification, generation and evolution of innovation candidates by performing the following actions 500.

At 502, in some embodiments, the candidate generation module 130 may use insights produced in actions 300, 400 to generate initial sets of conceptual innovation candidates. In some embodiments, each candidate may comprise a proposed system or method, identified novelty drivers, technical mechanisms, and/or functional improvements over prior art.

At 504, in some embodiments, the candidate generation module 130 may perform a multi-agent evaluation (e.g., a forest of evaluators) and submit each candidate to an ensemble of evaluating agents, where each agent may apply distinct heuristics, including novelty scoring, technical feasibility, structural distinctiveness, cross-domain transfer potential, and/or support from literature-grounded evidence. In some embodiments, the resulting scores along may be combined with computed scores determined by the data mining module 120 (e.g., weighted, if score X has higher weight than Y it may be weighted to have more effect on the final score) into a final innovation/invention score.

At 506, in some embodiments, the module 130 may next perform evolutionary refinement (also referred herein as breeding) by selecting the highest-scoring candidate(s) and computationally recombining their core inventive concepts (e.g., mechanisms, structural arrangements, algorithmic steps determined in other sections) to synthesize new candidates. In some embodiments, these candidates may be represented as structured JSON objects.

In some embodiments, the module 130 may employ genetic operators such as crossover (e.g., wherein data agents may propose children candidates by combining materials, mechanisms, architectures, etc. from parent candidates) and/or mutation (e.g., wherein LLMs may be used to inherently introduce mutations by hallucinations and/or by adding controlled variations of parameters for each generation of candidates.

In some embodiments, the module 130 may integrate insights harvested from actions 400 to ensure refinements are directionally guided and preferably not completely random (however, in some instances, some randomness may be intentionally allowed to facilitate beneficial mutations). Then at each epoch, the N best scoring candidates may be identified, kept and used as parents for new generations of candidates.

At 508, in some embodiments, if the termination conditions are not yet met, the candidate generation module 130 may next perform one or more recursive optimization loops with termination conditions to provide the resulting innovation candidates. For example, the module 130 may send generated innovation candidates back to the data mining module 120 at C for further refinement so that the data mining module 120 may perform actions 400 with respect to the input candidate, and/or provide innovation candidates back to the knowledge graph module 110 at D so that the knowledge graph module 110 may perform actions 300 (e.g., update and reevaluate) with respect to the innovation candidates. That is, actions 300, 400 may be repeated to progressively refine candidates until a predefined innovation-quality score threshold is satisfied, the set of candidates didn't change for R steps (e.g., when the progressively generated children candidates are deemed inferior), and/or a maximum epoch count or resource budget may be reached. This process may ensure convergence, reproducibility, and consistent candidate quality.

Then, when termination conditions may be met, the candidate generation module 130 may output the one or more innovation candidates at 510.

It is understood that any aspect and/or element of any embodiment of the AI innovation development system 100 described herein or otherwise may be combined in any way with any other aspect and/or element of any other embodiment of the AI innovation development system 100 to form additional embodiments of the AI innovation development system 100 all of which are within the scope of the AI innovation development system 100.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to" and are not intended to exclude other components unless specifically so stated.

It will be appreciated that variations to the embodiments of the invention can be made while still falling within the scope of the invention. Alternative features serving the same, equivalent, or similar purpose can replace features disclosed in the specification, unless stated otherwise. Thus, unless stated otherwise, each feature disclosed represents one example of a generic series of equivalent or similar features.

The present invention also covers the exact terms, features, values, and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A computer-implemented method for generating innovation candidates, comprising:

ingesting, by one or more processors, heterogeneous technical data from a plurality of repositories including at least one of patent documents, scientific literature, and internal disclosures;

parsing and normalizing the heterogeneous technical data and extracting technical entities and relationships from the heterogeneous technical data;

generating, for at least some of the extracted technical entities and relationships, respective multi-dimensional feature vectors that encode at least (i) a semantic representation and (ii) a temporal indicator;

populating a time-aware, multi-modal knowledge graph with nodes and edges representing the at least some of the extracted technical entities and relationships, wherein the nodes are associated with the multi-dimensional feature vectors;

deploying a plurality of analytical agents configured to query the time-aware, multi-modal knowledge graph to produce mining outputs including at least one of (i) whitespace mapping identifying underexplored regions of the knowledge graph, (ii) temporal trend extraction and projection, and (iii) cross-domain transferability analysis;

generating, based on the mining outputs, an initial set of innovation candidates, each innovation candidate comprising a machine-readable representation of a proposed technical concept;

evaluating the innovation candidates using a multi-agent evaluator ensemble that produces, for each innovation candidate, a composite score based on a plurality of heuristics including novelty and feasibility; and iteratively refining the innovation candidates using an evolutionary refinement process that selects higher-scoring innovation candidates and computationally recombines inventive concepts to generate new innovation candidates, wherein the deploying, evaluating, and iteratively refining are repeated in a recursive feedback loop until a termination condition is satisfied, and wherein one or more final innovation candidates are output responsive to satisfaction of the termination condition.

2. The method of claim 1, wherein ingesting heterogeneous technical data comprises continuously retrieving data from a plurality of external databases and providing it to a retrieval-augmented generation (RAG) preprocessing subsystem.

3. The method of claim 1, wherein parsing and normalizing the heterogeneous technical data comprises extracting technical entities using a predefined schema that identifies at least functional elements, operating parameters, and performance metrics.

4. The method of claim 1, wherein generating the multi-dimensional feature vectors comprises encoding at least one of:

a novelty score relative to prior art embeddings, a non-obviousness indicator based on rarity of co-occurring features, and a utility indicator derived from claimed performance improvements.

5. The method of claim 1, wherein populating the time-aware, multi-modal knowledge graph comprises linking nodes using at least one of similarity metrics, causal dependencies, and temporal progressions.

6. The method of claim 1, wherein the plurality of analytical agents comprises at least one whitespace agent configured to identify sparsely connected regions of the knowledge graph using density-based clustering.

7. The method of claim 1, wherein the whitespace mapping comprises identifying clusters having a higher density of academic literature nodes than patent document nodes.

8. The method of claim 1, wherein the temporal trend extraction comprises tracking topic trajectories across successive time windows and classifying topics as emerging, plateauing, or declining.

9. The method of claim 1, wherein the cross-domain transferability analysis comprises identifying structurally similar subgraphs across different technical domains having low application overlap.

10. The method of claim 1, wherein evaluating the innovation candidates comprises computing a composite score that combines evaluator-agent scores with scores derived from the multi-dimensional feature vectors.

11. The method of claim 1, wherein the recursive feedback loop further comprises re-querying the knowledge graph using refined innovation candidates as inputs.

12. The method of claim 1, wherein the termination condition comprises satisfaction of a predefined innovation-quality score threshold or detecting convergence of innovation candidates across successive refinement iterations.

13. A system for generating innovation candidates, comprising:

one or more processors; and one or more non-transitory computer-readable media storing instructions that, when executed by the one or more processors, cause the system to:

ingest heterogeneous technical data from a plurality of repositories including at least one of patent documents, scientific literature, and internal disclosures;

parse and normalize the heterogeneous technical data, and extract technical entities and relationships;

generate multi-dimensional feature vectors for the extracted technical entities and relationships, the multi-dimensional feature vectors encoding at least a semantic representation and a temporal indicator;

construct and maintain a time-aware, multi-modal knowledge graph comprising linked datapoints represented as nodes connected by edges representing detected relationships, wherein the nodes are associated with the multi-dimensional feature vectors;

execute a plurality of domain-specialized agents that query the knowledge graph to generate mining outputs including whitespace mapping and at least one of temporal trend projection or cross-domain transfer analysis;

generate innovation candidates based on the mining outputs;

score the innovation candidates using a multi-agent evaluator ensemble configured to apply distinct heuristics to produce composite scores; and perform evolutionary refinement by selecting a subset of the innovation candidates based on the composite scores and recombining elements of the selected subset to generate additional innovation candidates, while requesting updated mining outputs from the plurality of domain-specialized agents as part of a recursive refinement loop, wherein the system outputs one or more innovation candidates when a termination criterion corresponding to at least one of a quality threshold, a stability criterion, or a resource budget is met.

14. The system of claim 13, wherein the multi-agent evaluator ensemble comprises evaluator agents applying distinct heuristics including novelty scoring, technical feasibility, and cross-domain applicability.

15. The system of claim 13, wherein the evolutionary refinement is guided by updated mining outputs generated during each refinement iteration.

16. The system of claim 13, wherein the system is configured to dynamically ingest newly published literature while maintaining the knowledge graph in near real time.

17. A non-transitory computer-readable medium storing instructions that, when executed by one or more processors, cause performance of operations comprising:

constructing a time-aware, multi-modal knowledge graph from heterogeneous technical data by extracting technical entities and relationships and associating nodes in the knowledge graph with multi-dimensional feature vectors including temporal indicators;

performing knowledge-graph mining using a plurality of analytical agents to generate at least whitespace mapping output identifying sparsely connected regions of the knowledge graph; and generating and evolving innovation candidates via an evolutionary inference engine that (i) generates candidate concepts based on the mining, (ii) evaluates the candidate concepts using a plurality of evaluator agents applying distinct heuristics, and (iii) iteratively recombines higher-scoring candidate concepts in a recursive loop that incorporates updated mining output until a termination condition is satisfied.

18. The non-transitory computer-readable medium of claim 17, wherein the operations further comprise computing citation network features indicative of non-obviousness.

19. The non-transitory computer-readable medium of claim 17, wherein the operations further comprise identifying innovation candidates representing cross-domain transfer of mechanisms between unrelated technical fields.

20. The non-transitory computer-readable medium of claim 17, wherein the recursive loop comprises periodically injecting interdisciplinary data to increase diversity of innovation candidates.

* * * * *